(12) United States Patent
Bint et al.

(10) Patent No.: US 12,419,481 B2
(45) Date of Patent: Sep. 23, 2025

(54) ANGLED AUTO WINDOW WASHER AND SQUEEGEE FOR REAR SPOILERS

(71) Applicants: Timothy D. Bint, Driftwood, TX (US); Davis M. Bint, Driftwood, TX (US)

(72) Inventors: Timothy D. Bint, Driftwood, TX (US); Davis M. Bint, Driftwood, TX (US)

(73) Assignees: Timothy D. Bint, Driftwood, TX (US); Davis M. Bint, Driftwood, TX (US); Tyler Jameson Bint, Driftwood, TX (US)

( * ) Notice: Subject to any disclaimer, the term of this patent is extended or adjusted under 35 U.S.C. 154(b) by 0 days.

(21) Appl. No.: 18/416,235

(22) Filed: Jan. 18, 2024

(65) Prior Publication Data
US 2025/0235070 A1 Jul. 24, 2025

(51) Int. Cl.
*A47L 13/11* (2006.01)
*B60S 3/04* (2006.01)

(52) U.S. Cl.
CPC ............. *A47L 13/11* (2013.01); *B60S 3/045* (2013.01)

(58) Field of Classification Search
CPC .......... B60S 3/045; B60S 3/00; A47L 13/254; A47L 13/11; B08B 1/36; B08B 1/34; B08B 1/165
USPC .......................................................... 15/117
See application file for complete search history.

(56) References Cited

U.S. PATENT DOCUMENTS

| | | | |
|---|---|---|---|
| 2,357,446 A * | 9/1944 | Bendar | A47L 13/14 15/119.2 |
| 3,968,535 A | 7/1976 | Nichols, Jr. | |
| 4,893,370 A | 1/1990 | Klotz | |
| 5,255,405 A | 10/1993 | Samuelsson et al. | |
| 5,343,586 A | 9/1994 | Vosbikian | |
| 5,349,716 A | 9/1994 | Millar | |
| 5,539,949 A * | 7/1996 | Stanton | A47L 13/11 15/245 |
| 5,603,138 A | 2/1997 | Bonis | |
| 5,862,562 A | 1/1999 | Erken | |
| 5,862,565 A * | 1/1999 | Lundstedt | A47L 1/15 15/228 |
| 6,092,255 A | 7/2000 | Kim | |
| 7,363,678 B2 | 4/2008 | Varner | |
| 8,312,589 B1 | 11/2012 | Thomas | |
| 10,093,281 B2 | 10/2018 | Vande Vyvere | |
| 11,453,034 B2 | 9/2022 | Greenberger | |
| 2006/0032010 A1 | 2/2006 | Francois | |
| 2006/0254009 A1 | 11/2006 | Tsai et al. | |
| 2011/0173768 A1* | 7/2011 | Donato | A47L 1/06 15/245 |

* cited by examiner

*Primary Examiner* — Katina N. Henson
(74) *Attorney, Agent, or Firm* — Dunlap Bennett & Ludwig, PLLC

(57) ABSTRACT

A handheld window cleaning tool having a squeegee blade shaped as a parallelogram having diagonally opposing corners defined by angles of approximately forty-five degrees. The squeegee blade is secured along a first longitudinal edge of a head shaped as a parallelogram having diagonally opposing corners defined by angles of approximately forty-five degrees so that the lateral edges of the squeegee blade and the head are colinear. The opposing longitudinal edge of the head may secure a hollow sponge portion also defined by a parallelogram having diagonally opposing corners defined by angles of approximately forty-five degrees.

17 Claims, 6 Drawing Sheets

ANGLED AUTO WINDOW WASHER AND SQUEEGEE FOR REAR SPOILERS

BACKGROUND OF THE INVENTION

The present invention relates to cleaning tools for windows and, more particularly, to an angled automobile window washer and squeegee for cleaning a rear window of an automobile with a rear spoiler.

Window cleaning devices typically have a sponge portion for the application of cleaning or rinsing liquid to a window during cleaning, and a squeegee portion for removal of the cleaning or rinsing liquid. The sponge and the squeegee blade typically are affixed on opposite sides of a head of an elongated handle, enabling manipulation of the sponge and squeegee to clean the window with both sides of the cleaning device. Most notably, the squeegee blade is dragged along the surface of the window from one lateral edge thereof to the opposing lateral edge in one uninterrupted stroke to prevent streaks when removing the sponged-on cleaning liquid.

Modern automobiles, especially sport utility vehicles, have rear window sport spoilers on the upper portion of the rear window. This spoiler creates a V-shaped valley between the window and the spoiler, whereby the latter becomes a barrier for squeegees portions of current window cleaning tools, as the overhanging spoiler prevents any portion of the squeegee blade from properly engaging the upper periphery of the windshield during the uninterrupted stroke. In other words, the handle and head and resulting squeegee blade are not dimensioned and shaped to access this valley to engage the window up to its upper periphery that interfaces the spoiler. Particularly challenging is getting the end of the squeegee blade into the acute angle of the V-shaped valley to reach this interface, as any change of direction of the squeegee portion along the window during the uninterrupted stroke tends to leave undesirable streaks. As a result, individuals cleaning these vehicles are unable to clean (with water) and wipe off the dirt in this area of the windshield with any handheld cleaning apparatus currently on the market.

Put another way, existing automobile window squeegees are not designed to reach into the V-shaped areas under the rear window spoilers as their edges are 90-degree angles, defining a rectangle, which do not fit up into the narrow area under the spoiler. Since they are not shaped correctly, they do not work well to clean an upper portion of an automobile rear window defined by the spoiler.

As can be seen, there is a need for an angled automobile window washer and squeegee for cleaning a rear window of an automobile with a rear spoiler.

SUMMARY OF THE INVENTION

The angled squeegee embodied in the present invention is designed so that both ends of the sponge and the squeegee blade is angled at approximately 135-degree angles relative to a length of the leading edge of the squeegee blade, thereby these edges can fit all the way into the V-shaped space of an automobile window defined by a spoiler area, allowing this area to be fully cleaned and wiped off.

The present invention is an improvement over existing vehicle window squeegees because it specifically solves the hard-to-reach V-shaped area of SUV with rear window spoilers, and it also serves as a traditional window squeegee for the rest of the automobile's windows, so a user only needs one device to completely clean this type of vehicle.

The angled squeegee is designed specifically with an angled frame or head that supports complementary the angled sponge and squeegee portions, so that the edges of the head, squeegee blade, and sponge are substantially colinear.

In one aspect of the present invention, a window cleaning device provides a squeegee blade defined by a parallelogram having two diagonally opposing blade angles that are approximately forty-five degrees.

In another aspect of the present invention, the window cleaning device further provides a head defined by a parallelogram having two diagonally opposing head angles that are approximately forty-five degrees; a first longitudinal edge of the head providing a first attachment for the squeegee blade; a handle orthogonally extending from an upper surface of the head; a second longitudinal edge of the head providing a second attachment for a sponge portion defined by a parallelogram having two diagonally opposing sponge angles that are approximately forty-five degrees, wherein the first and second attachments are slots, wherein opposing lateral edges of the head, the squeegee blade, and the sponge portion are substantially colinear, and wherein the sponge portion is hollow.

In yet another aspect of the present invention, a method of cleaning an area of an automotive windshield under a spoiler, the method includes providing the above-mentioned window cleaning device and stroking said area with one of the two lateral edges of the squeegee blade.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a handheld window cleaning tool having a squeegee blade shaped as a parallelogram having diagonally opposing corners defined by angles of approximately forty-five degrees. The squeegee blade is secured along a first longitudinal edge of a head shaped as a parallelogram having diagonally opposing corners defined by angles of approximately forty-five degrees so that the lateral edges of the squeegee blade and the head are colinear. The opposing longitudinal edge of the head may secure a hollow sponge portion also defined by a parallelogram having diagonally opposing corners defined by angles of approximately forty-five degrees.

Figure 1:
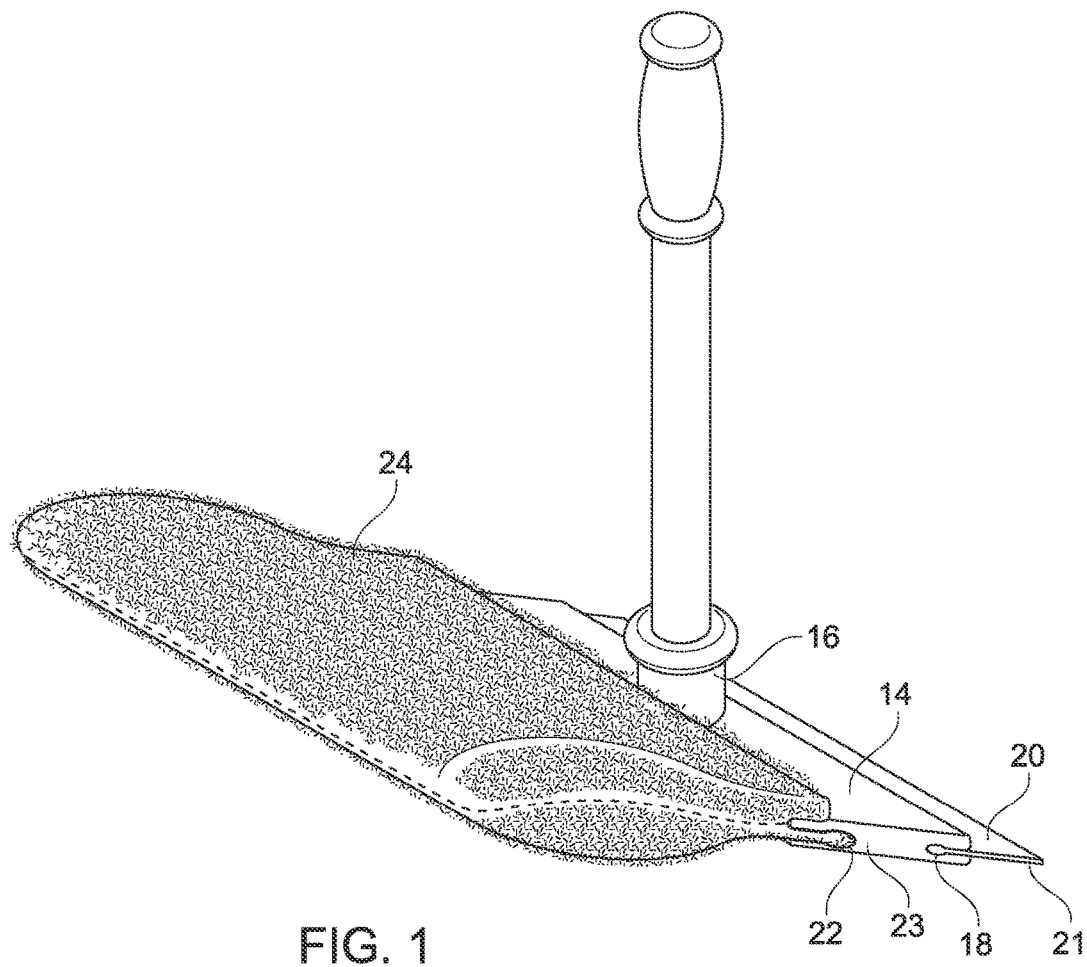
FIG. 1 is a perspective view of an exemplary embodiment of the present invention.
Figure 2:
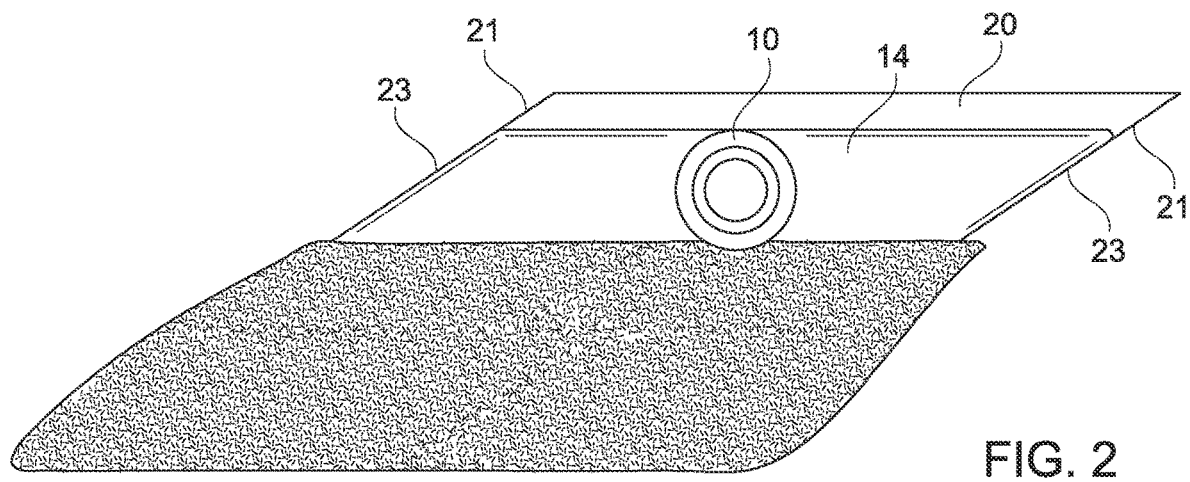
FIG. 2 is a top plan view of an exemplary embodiment of the present invention.
Figure 3:
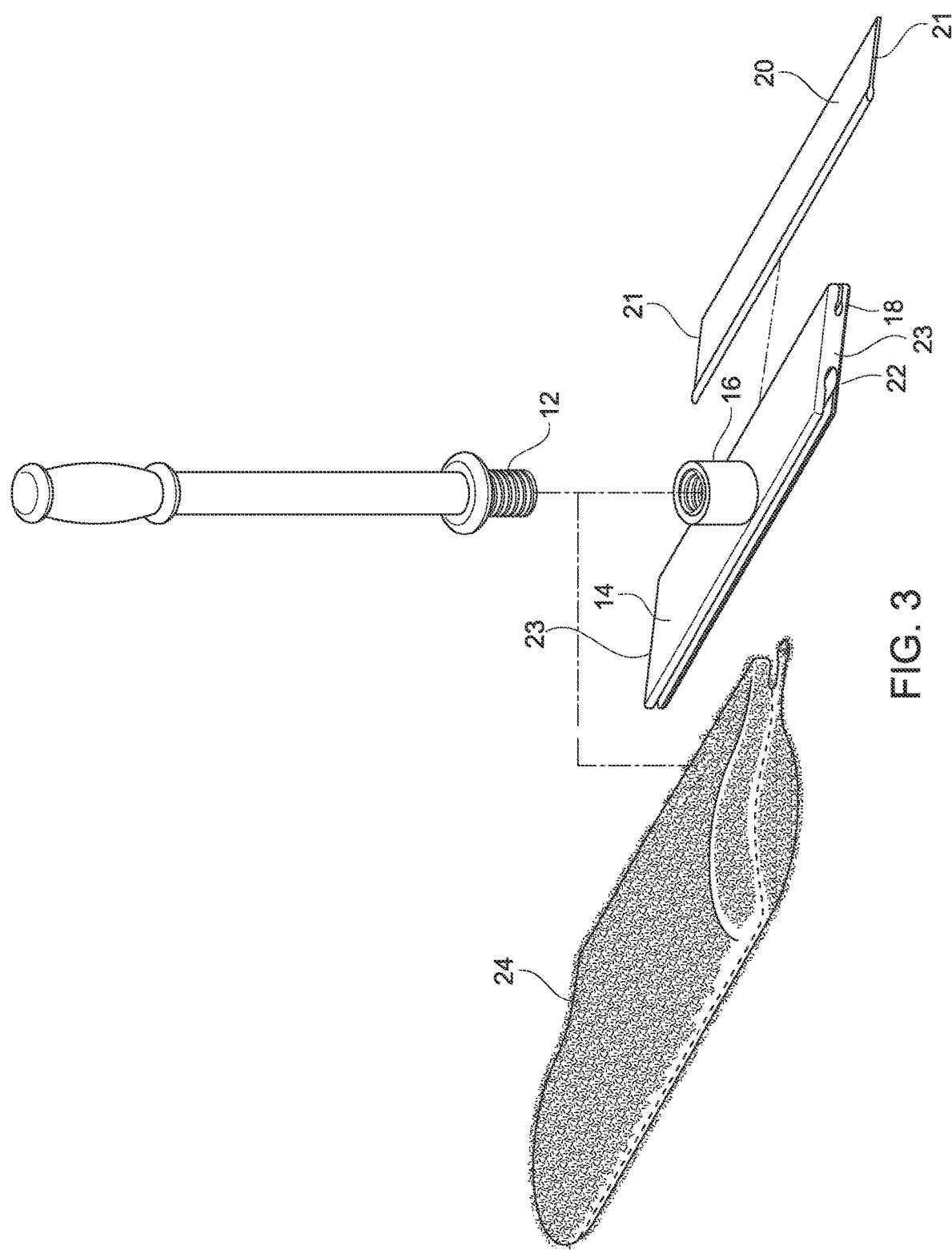
FIG. 3 is an exploded perspective view of an exemplary embodiment of the present invention.
Figure 4:
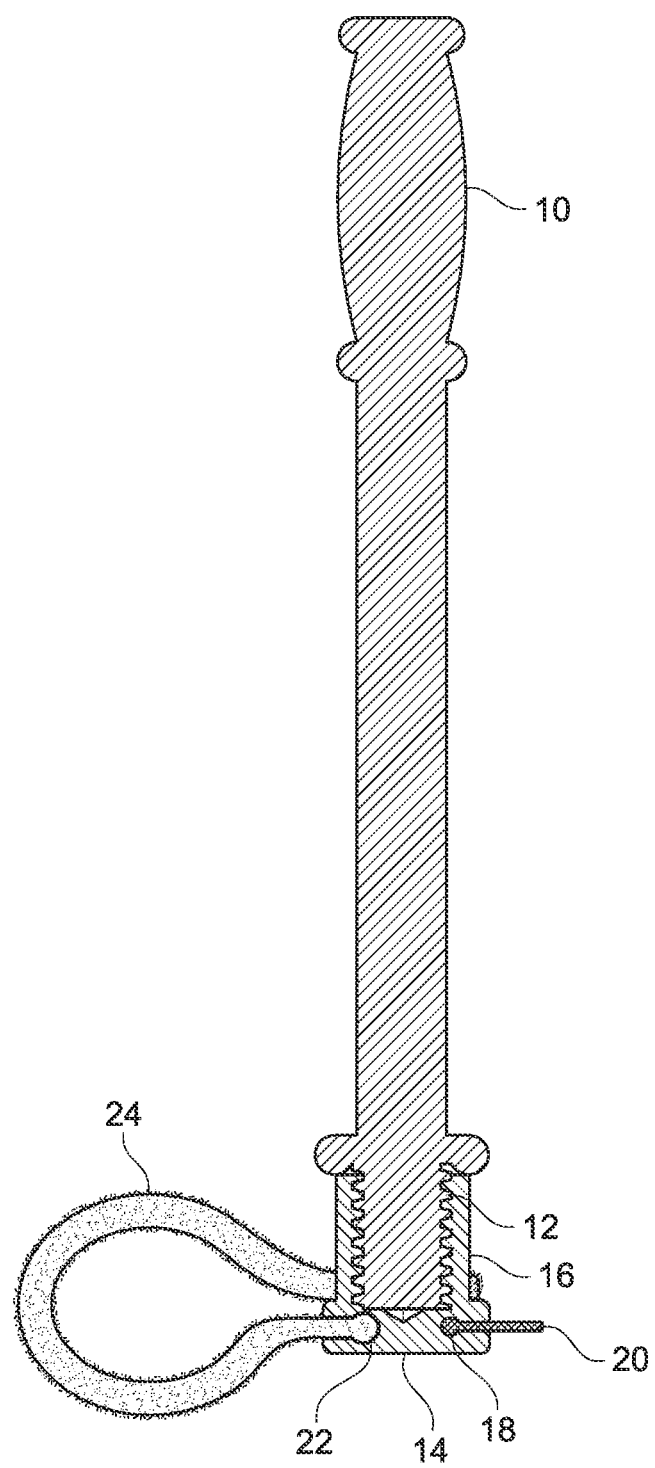
FIG. 4 is a section view of an exemplary embodiment of the present invention.
Figure 5:
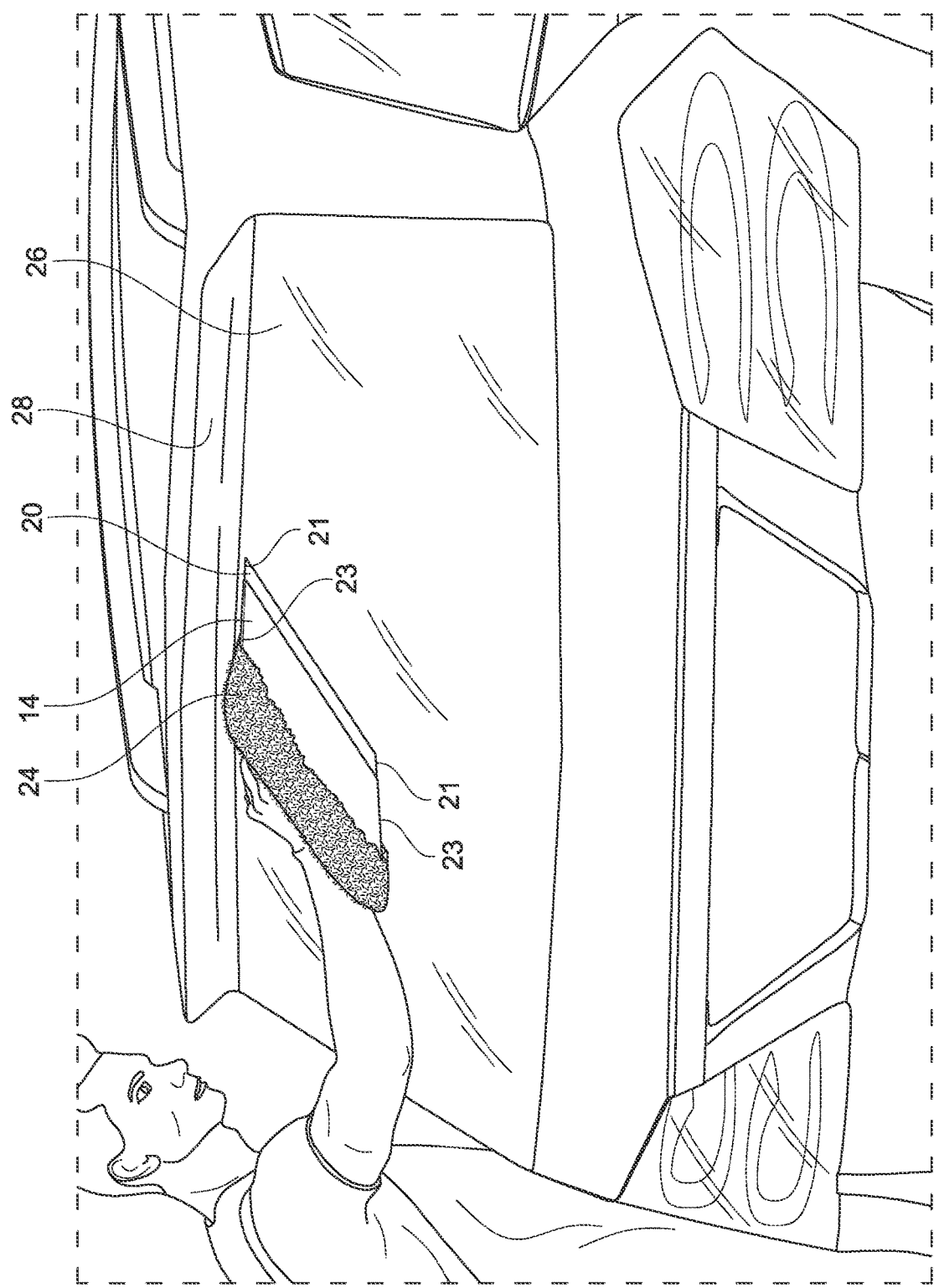
FIG. 5 is a perspective view of an exemplary embodiment of the present invention, shown in a first used condition urging the squeegee blade 20 against the window.
Figure 6:
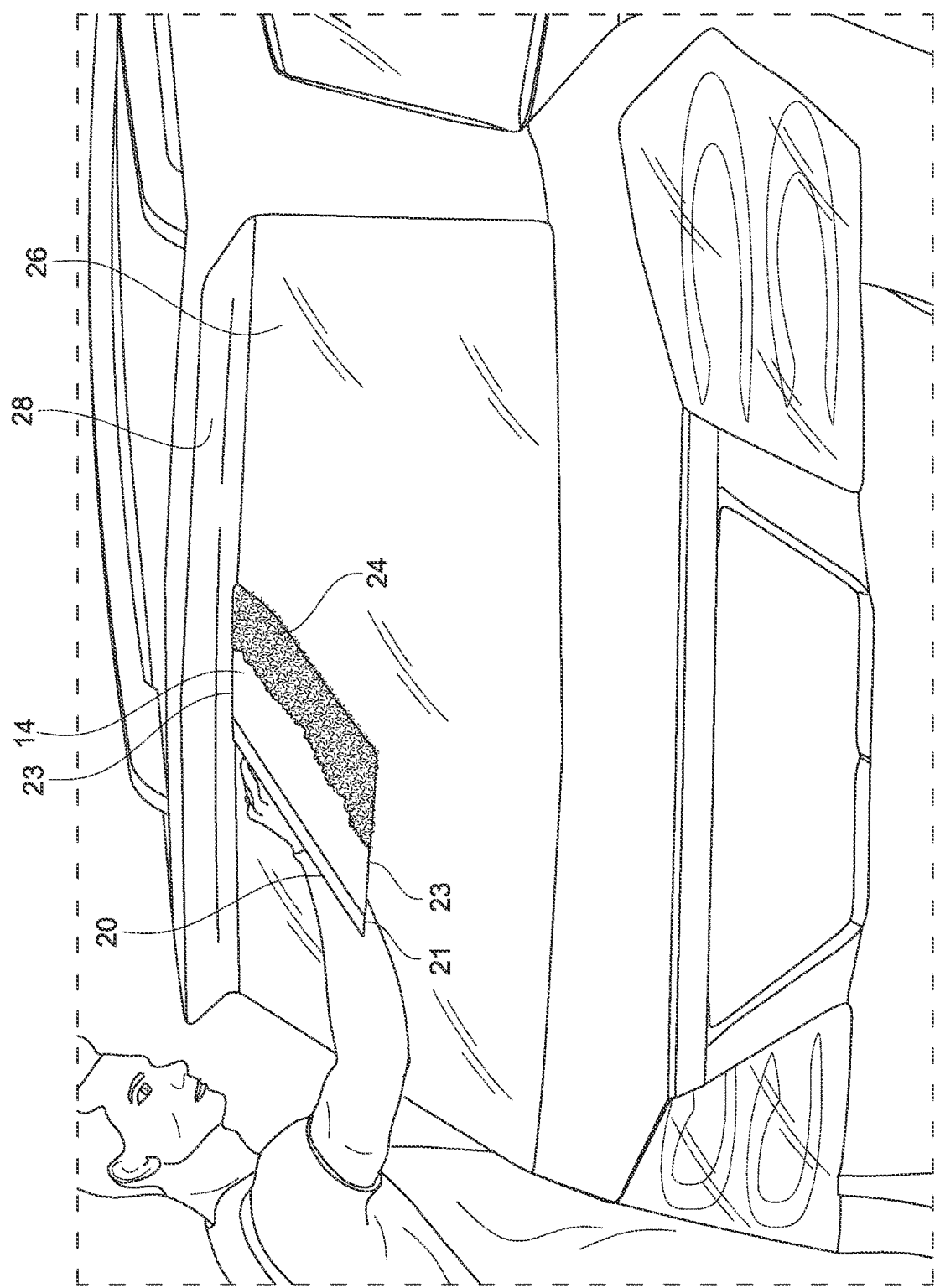
FIG. 6 is a perspective view of an exemplary embodiment of the present invention, shown in a second used condition urging the mop head against the window.
Figure 7:
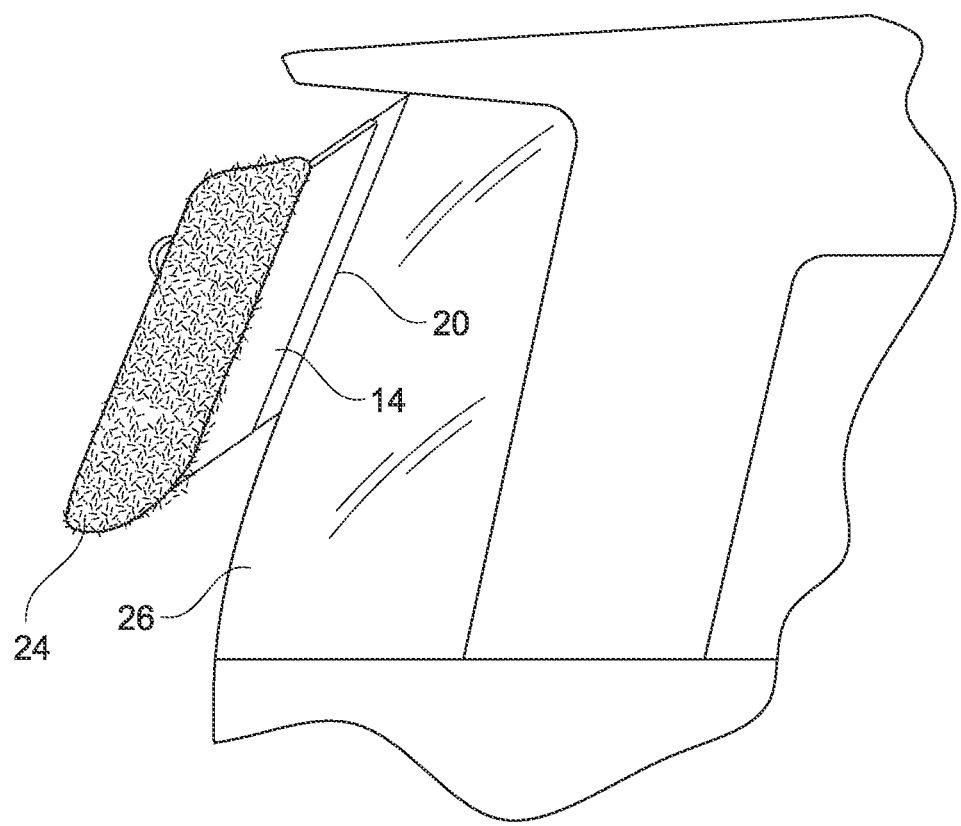
FIG. 7 is a side elevation view of an exemplary embodiment of the present invention, shown in a used condition.

Referring to FIGS. 1 through 7, the present invention may include a handle-held window cleaning device having a head 14 securing one or both of an angled sponge portion 24 and an angled squeegee portion 20. The head 14 may be removably attached to a handle 10 by way of mating threading—for example, that head 14 may provide a threaded receptacle 16 that operatively associates with a threaded tip 12 of the head 14; though other methods of removably attaching the head 14 to the handle 10 are contemplated by the present invention as long as it enables the functionality disclosed herein. The head 14 may provide securing plates with oppositely facing squeegee slot 18 and sponge slot 22 along the securing plates' longitudinal edges.

Uniquely, the head/frame 14 and/or securing plates define a parallelogram with two catty-corner angles that are approximately forty-five degrees, resulting in "angled head ends" 23. Similarly, squeegee blade/portion 20 defines a parallelogram with two catty-corner angels that are approximately forty-five degrees, resulting in "angled squeegee ends" 21. Likewise, the sponge portion 24 may define a parallelogram with two catty-corner 45-degree angled ends.

Once the handle 10 and angled head 14 are assembled and the sponge portion 24 and the squeegee portion 20 with the angled ends 21 are attached, the device works as a two-purpose tool to both wash and wipe dry the windshield 26 of automobiles, in particular, vehicles such as SUVs, with the rear upper window spoilers. Using the angled sponge side of the device the user will apply the wet sponge 24 under the V-shaped area of windshield 26 under the rear spoiler 28 using the device's angled sponge edge/end to reach all the way to the end of the windshield 26. Then the device is flipped over, and the angled ends 21 of the squeegee blade 20 is pulled across this same V-shaped area to remove all the water and remaining dirt that has been unreachable by other squeegee devices.

The handle and housing would likely be either 3D printed using a plastic material or would be fabricated from plastic using traditional extrusion molding methods. A CAD image of the final design could be the blueprint used for this part of the manufacturing. For the angled sponge squeegee, existing manufacturing techniques that make similar sponges would be used, with the angle edge being the one design exception that the fabricator would need to incorporate. The sponge may have a fabric mess exterior covering (protective covering) applied as the last step in its fabrication. The angled rubber blade would be molded in a rubber fabrication process with the angled edge and the groove that will hold it into the housing. Once all the components are individually fabricated, the parts can be assembled.

The standard device would be designed to support use at retail gas service stations where travelers use the stores squeegee to clean their auto windshields. All noted elements of the device would be needed to support this anticipated usage. The handle might be made from wood as an option. There could be other versions of this angled squeegee that are sold to auto owners that could be more portable, foldable, smaller in size, and that might contain a handle that holds water for use on the squeegee. These alternatives would still rely on the core utility of the angled housing, angled wiper blade and angled sponge squeegee.

A method of using the present invention may include the following. A person would hold the angled auto squeegee in one hand and first apply the wetted angled sponge side to the SUV windshield, especially the V-shaped area under the rear windshield spoiler, to loosen dirt and then the person would flip the device over and still holding it in one hand apply the angled wiper blade to the wetted area on the windshield to dry off all water and loosened dirt. The remaining portion of the windshield would be wetted and wiped dry using the same process because the device will have traditional sponge area and wiper blade areas inside of the angled edge for use on the remaining portion of the windshield.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A window cleaning device comprising:
a head operatively associable with a squeegee blade;
the squeegee blade comprising a leading longitudinal blade edge, a trailing longitudinal blade edge, an upper lateral blade edge and a lower lateral blade edge forming a blade parallelogram, wherein the leading longitudinal blade edge and the upper lateral blade edge define an included blade angle that is approximately forty-five degrees; and
a handle fixed to the head in an orthogonal orientation relative to the blade parallelogram.

2. The window cleaning device of claim 1, wherein the head comprises a leading longitudinal head edge, a trailing longitudinal head edge, an upper lateral head edge and a lower lateral head edge forming a head parallelogram, wherein the leading longitudinal head edge and the upper lateral head edge define an included head angle that is approximately forty-five degrees; and the leading longitudinal head edge comprises a first attachment for the squeegee blade.

3. The window cleaning device of claim 2, wherein the trailing longitudinal head edge comprises a second attachment for a sponge portion.

4. The window cleaning device of claim 3, wherein the first and second attachments are slots.

5. The window cleaning device of claim 3, wherein the sponge portion comprises a leading longitudinal sponge edge, a trailing longitudinal sponge edge, an upper lateral sponge edge and a lower lateral head sponge forming a sponge parallelogram, wherein the leading longitudinal sponge edge and the upper lateral head sponge define an included sponge angle that is approximately forty-five degrees.

6. The window cleaning device of claim 5, wherein the upper lateral sponge edge and the upper lateral blade edges are substantially colinear.

7. The window cleaning device of claim 4, wherein the respective lateral blade edges and lateral head edges are substantially colinear.

8. The window cleaning device of claim 7, wherein the sponge portion is hollow.

9. A method of cleaning an upper periphery of an automotive windshield under a spoiler, the method comprising:
providing the window cleaning device of claim 7; and
uninterruptedly stroking said upper periphery with the leading longitudinal blade edge of the squeegee blade.

10. A window cleaning device for a window having a periphery interfacing an overhanging structure, the window cleaning device comprising:

a head operatively associable with a squeegee blade;
the squeegee blade comprising a leading longitudinal blade edge, a trailing longitudinal blade edge, an upper lateral blade edge and a lower lateral blade edge, wherein the leading longitudinal blade edge and the upper lateral blade edge define an included blade angle that is approximately forty-five degrees; and
a handle fixed to the head in an orthogonal orientation relative to the blade parallelogram.

11. The window cleaning device of claim 10, wherein the head comprises a leading longitudinal head edge, a trailing longitudinal head edge, an upper lateral head edge and a lower lateral head edge, wherein the leading longitudinal head edge and the upper lateral head edge define an included head angle that is approximately forty-five degrees; and the leading longitudinal head edge comprises a first attachment for the squeegee blade.

12. The window cleaning device of claim 11, wherein the trailing longitudinal head edge comprises a second attachment for a sponge portion.

13. The window cleaning device of claim 12, wherein the first and second attachments are slots.

14. The window cleaning device of claim 13, wherein the respective lateral blade edges and lateral head edges are substantially colinear.

15. The window cleaning device of claim 14, wherein the sponge portion is hollow.

16. The window cleaning device of claim 15, wherein the sponge portion comprises a leading longitudinal sponge edge, a trailing longitudinal sponge edge, an upper lateral sponge edge and a lower lateral sponge edge, wherein the leading longitudinal sponge edge and the upper lateral sponge edge define an included sponge angle that is approximately forty-five degrees.

17. The window cleaning device of claim 16, wherein the upper lateral sponge edge and the upper lateral blade edges are substantially colinear.

\* \* \* \* \*